Oct. 16, 1962  D. P. RUTTER  3,058,860
SNAP-ON METAL JACKETED PIPE INSULATION
Filed Sept. 29, 1958

INVENTOR
DONALD P. RUTTER
BY
*John R. McKinney*
ATTORNEY

United States Patent Office 3,058,860
Patented Oct. 16, 1962

3,058,860
SNAP-ON METAL JACKETED PIPE INSULATION
Donald P. Rutter, Bernardsville, N.J., assignor to Johns-Manville Corporation, New York, N.Y., a corporation of New York
Filed Sept. 29, 1953, Ser. No. 763,936
4 Claims. (Cl. 154—44)

This invention relates to an insulation for conduits and is particularly directed to a metal jacketed molded insulation for use on circular objects such as pipe. The term "molded insulation" is used to include any substantially, relatively non-resilient insulating material such as: pipe insulations containing 85% magnesia and 15% asbestos; pipe insulation wherein specially selected and calcined diatomaceous silica is blended with other insulating materials and bonded with asbestos fiber; pipe insulations composed of hydrous calcium silicate combined asbestos fibers; and other pipe insulations possessing characteristics of this nature.

The above types of molded insulations are generally marketed in semi-cylindrical sections which are adapted to be joined together into a cylinder surrounding the pipe to be insulated. In the majority of outdoor uses of such pipe it is expedient that such insulation be jacketed by sheet material, the preferred metal in most instances being aluminum. In normal applications, the aluminum jacket is applied after the insulation is in position around the pipe. Such type of application makes for a plurality of operations so that the installation of the insulation is time consuming and extremely expensive. For repairs and maintenance, it is necessary that the metal jacket and the insulation be readily removable from the pipe.

It is an object of this invention to provide an easily removable metal jacketed insulation for conduits that may be securely positioned around the conduit.

The foregoing object is accomplished in accordance with the instant invention in which two semi-cylindrical sections of molded pipe insulation are positioned so that their free edges, parallel to the longitudinal axes thereof, are in contiguous relationship to form a cylindrical pipe insulation. The semi-cylindrical sections are enclosed by an aluminum jacket wherein each semi-cylindrical section is secured to the aluminum jacket by a narrow adhesive strip extending longitudinally of and substantially parallel to the free edges of the semi-cylindrical section with which it is associated. The adhesive strips are so positioned that the pipe insulation may be opened along the longitudinal slit formed by a pair of adjacent free edges of the two semi-cylindrical sections and snapped into position around the pipe with a continuous section of the aluminum jacket between the adhesive strips acting as the hinge. An S-slip joint on the adjacent meeting ends of the aluminum jacket provides a means for positively securing the insulation around the pipe.

The invention will be more fully understood and further objects and advantages thereof will become apparent when reference is made to the following detailed description of a preferred embodiment of the invention and the accompanying drawing in which.

Figure 1:
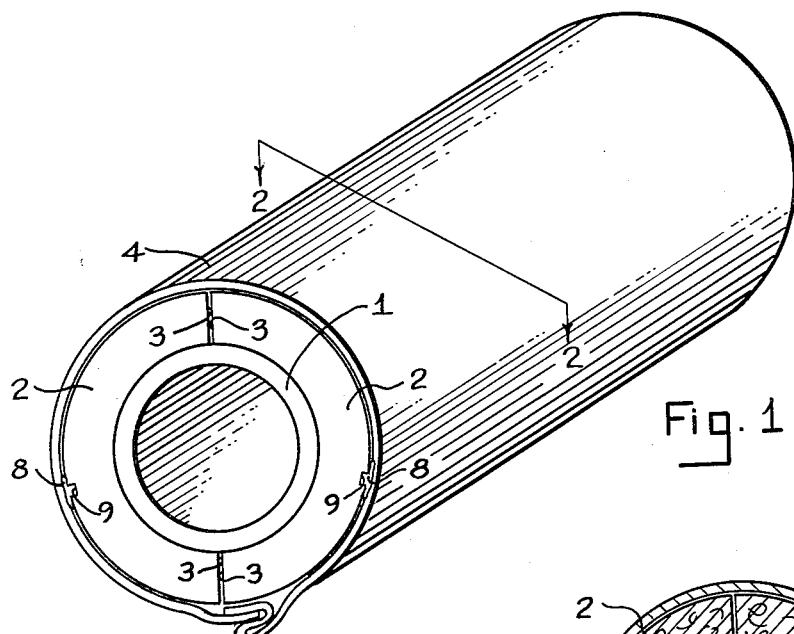
FIG. 1 is a pictorial representation of an aluminum jacketed pipe insulation.
Figure 2:
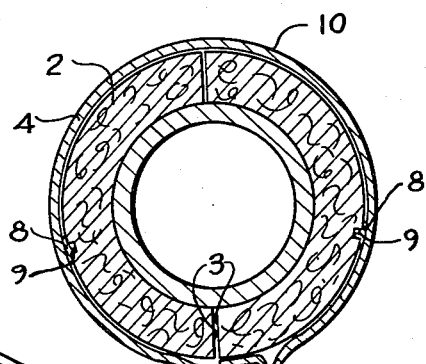
FIG. 2 is a view in section taken on the plane passing through the lines 2—2 of FIG. 1.

Referring to the drawing and in particular to FIG. 1, there is disclosed a molded insulation for a pipe 1 comprising a pair of mating semi-cylindrical sections 2. The cylindrical insulation for the pipe 1 is formed by placing the free longitudinal edges 3 of the sections 2 in contiguous relationship to form a pair of longitudinal slits, in which relationship the sections 2 are retained by a metal jacket 4 which surrounds the semi-cylindrical sections 2. In the drawing, the thickness of the metal jacket 4 has been exaggerated for illustration purposes. One longitudinally extending edge 5 of the metal jacket 4 is folded back upon itself to form an S-slip joint, as illustrated particularly in FIG. 2, which lies immediately adjacent one of the longitudinal slits formed by the meeting free edges 3 of the semi-cylindrical sections 2. The circumferential length of the metal jacket 4 when applied around a pair of mating semi-cylindrical sections 2 is slightly greater than the outside circumference of the cylindrical pipe insulation formed by the semi-cylindrical sections 2 so that the other longitudinally extending edge 6 of the metal jacket 4 may be inserted into the S-slip joint 5 when the metal jacketed insulation is positioned around the pipe. The S-slip joint positively secures the meeting edges 5 and 6 of the metal jacket 4 and yet allows for the expansion of the pipe insulation so that there is a minimum of leakage at the joint regardless of the lap position.

Each of the semi-cylindrical sections 2 is secured in position to the metal jacket 4 by a narrow adhesive strip 8. As used in the specification and claims, the term "narrow" when used in conjunction with the means securing the semi-cylindrical sections 2 to the metal jacket 4 means that the width of the securing means is very small when compared to the circumference of the pipe insulation, a specific example of such relationship being given later. A longitudinally extending channel 9 is formed in each semi-cylindrical section 2 and is so filled with an adhesive 8 that the adhesive extends slightly out of the channel 9 and into contact with the inner wall of the metal jacket 4 to secure the associated semi-cylindrical section 2 to the metal jacket 4, in proper position. The channel 9 provides a mechanical lock between the insulation and the adhesive and insures that the insulation will be held in the desired relative position on the metal jacket 4.

Figure 3:
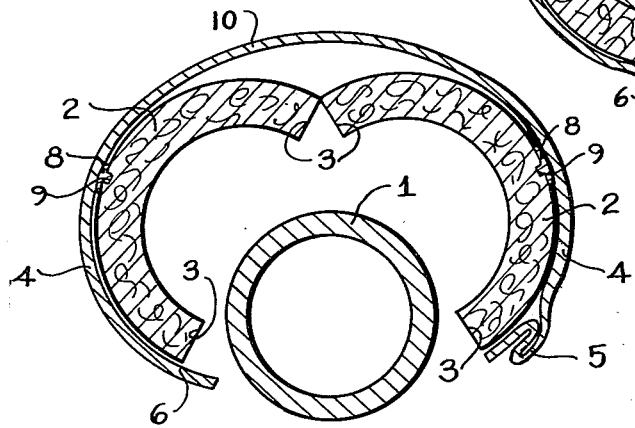
FIG. 3 is a view in section showing an aluminum jacketed pipe insulation being applied to a pipe.

As illustrated in FIG. 3, the semi-cylindrical sections 2 are secured to the metal jacket 4 so that the insulation may be opened along one of the longitudinal slits formed by the free edges 3 of the semi-cylindrical sections 2 and positioned around a pipe 1. The channels 9 and therefore the adhesive strips 8 are located in the semi-cylindrical sections 2 so that there exists a continuous free arcuate section 10, of considerable circumferential extent, of the metal jacket 4 between the contacting strips of adhesive. The continuous arcuate section 10 provides a large area free to flex and thus acts as a hinge allowing the semi-cylindrical sections 2 to be separated and snapped into position around the pipe 1 without damage, as by creasing or other structural strains, to the metal jacket 4. The resiliency of the metal jacket 4 urges the free edges 3 of the semi-cylindrical sections 2 into contiguous relationship. Because of the resiliency of the metal jacket 4, the continuous arcuate section 10, when flexed, provides an additional resilient force urging the sections 2 of insulation into generally tubular form. The S-slip joint between the ends 5 and 6 of the metal jacket 4 positively secures the metal jacket in position so that the free edges 3 of the semi-cylindrical sections 2 remain in contiguous relationship. For some types of insulation, it may be possible to eliminate the narrow channels 9 and secure the insulation to the metal jacket 4 by an adhesive coating except in that free area referred to above as required for flexing of the metal jacket.

The instant invention is especially adapted for use with pipe insulations of the molded type and particularly for semi-cylindrical sections of pipe insulation marketed by commercial concerns as staple articles of commerce under various trademarks, such as: "Fibrocel," a molded silicate insulation formed of an expanded silica aggregate; "Thermobestos," a molded insulation made by a special process and composed of hydrous calcium silicate combined with asbestos fiber; "Superex," a molded insulation manufactured by blending specially selected and calcined silica with other insulating materials and bonded with asbestos fiber; and 85% magnesia, a molded insulation principally comprising 85% magnesia and 15% asbestos.

In accordance with the instant invention, two semi-cylindrical sections, each having a wall thickness of 1 inch, of molded pipe insulation, identified above as sold under the trademark "Thermobestos," were retained in a cylindrical form having an outside diameter of 4⅝ inches and an inside diameter of 2⅝ inches by a metal jacket composed of aluminum sheeting .020 inch in thickness. The semi-cylindrical sections and the aluminum sheeting when formed into a cylindrical pipe insulation had a longitudinal length of 36 inches. The aluminum sheet had a useful circumferential extent of 15½ inches to provide a lap joint of approximately 1 inch within the S-slip joint. Each semi-cylindrical section was provided with a longitudinally extending channel 9 which was ⅛ inch in width and ⅛ inch in depth. Each channel 9 was filled with a conventional commercial asphalt of 190° F. melting point which secured the semi-cylindrical sections 2 to the aluminum jacket 4 in proper position. An example of such asphalt is Kendex 3430, manufactured by the Kendall Refining Co. Channels 9 were so positioned that the aluminum jacket 4 had a free and continuous arcuate section 10 of approximately 190° between the adhesive strips 8. This cylindrical pipe insulation satisfied entirely the objects of the invention; however, the above example is given for purposes of illustration only, and it is not intended to limit the invention thereto.

As described above, the invention is normally applied to straight runs of pipe but sweeps or large radius turns may be covered by cutting the metal jacketed insulation at predetermined alternate angles and reversing the sections so formed on assembly. Also, on larger diameter pipe a plurality of narrow channels will be made in each semi-cylindrical section and filled with adhesive for securing the semi-cylindrical sections in proper position on the metal jacket. The thickness of the aluminum sheeting is dependent upon the desired operating conditions and the process of forming the metal jacketed pipe insulation is applicable for a wide range of gauges as from .005 to .060 inch. In some installations, it may be necessary to provide a vapor barrier between the insulation and the metal jacket to prevent corroding of the metal jacket. For example, in the pipe insulation described in the illustration given above, a 40 lb. kraft paper was laminated to the aluminum sheeting by an asphalt coating in a conventional manner to provide such a vapor barrier. The semi-cylindrical sections of pipe insulation were then adhered to the kraft paper by the adhesive 8 in the channels 9, the combined metal jacket, kraft paper, and asphalt being related to the semi-cylindrical sections in the same manner as the metal jacket when no vapor barrier was employed. Although the invention is particularly directed to a molded pipe insulation, it is to be understood that, where desired, other types of insulation, including fully round fibrous pipe insulation, may be similarly secured to a metal jacket.

Having thus described the invention in rather full detail, it will be understood that these details need not be strictly adhered to and that various changes and modifications may suggest themselves to one skilled in the art, all falling within the scope of the invention as defined by the subjoined claims.

What I claim is:
1. Insulation for conduits comprising:
   (a) a generally tubular insulation for fitting around a conduit,
   (b) said insulation having at least one pair of generally longitudinally extending adjacent edges forming a longitudinal slit,
   (c) a generally tubular jacket comprising resilient sheet metal urging said jacket into said tubular form and covering said insulation,
   (d) said jacket having a pair of edges each of which extend generally parallel to said longitudinal slit,
   (e) one of said edges of said jacket when in said generally tubular form overlapping the other of said edges of said jacket to form a joint,
   (f) said longitudinal slit and said joint, when said insulation and said jacket are spread open along said slit and said joint, forming a passageway for said conduit so that said insulation may be positioned around said conduit,
   (g) said metal jacket resiliently urging said insulation into said generally tubular form with said edges of said insulation and said overlapping portions of the edges of said jacket in contiguous relationship,
   (h) means securing said insulation to said metal jacket,
   (i) said metal jacket having a portion, of continuous longitudinal extent and continuous arcuate extent between said securing means, generally diametrically opposite said longitudinal slit and said joint, providing a continuous resilient arcuate hinge section,
   (j) said continuous resilient arcuate hinge section being free of securement to said insulation and presenting an area free to flex and act as a resilient hinge so that said insulation may be opened along said joint and said longitudinal slit to be positioned around said conduit, and
   (k) said continuous resilient arcuate hinge section when flexed providing an additional resilient force urging said insulation into said generally tubular form with said edges of said insulation and said overlapping portions of the edges of said joint in contiguous relationship so that said insulation may be snapped into position around said conduit.

2. Insulation for conduits as defined in claim 1 wherein said insulation comprises:
   (a) a pair of mating semi-cylindrical sections of molded insulation.

3. Insulation for conduits as described in claim 2 wherein said securing means comprises:
   (a) at least one pair of narrow strips of adhesive between said insulation and said metal jacket,
   (b) said strips of adhesive extending generally parallel to said longitudinal slit.

4. Insulation for conduits as described in claim 2 wherein said joint comprises:
   (a) an S-slit joint on one edge of said metal jacket adapted to receive the other edge of said metal jacket.

References Cited in the file of this patent

UNITED STATES PATENTS

| | | |
|---|---|---|
| 282,368 | Reilly | July 31, 1883 |
| 347,631 | Merriam | Aug. 17, 1886 |
| 1,709,844 | Durant | Apr. 23, 1929 |
| 1,772,378 | Witt | Aug. 5, 1930 |
| 1,860,203 | Rishel | May 24, 1932 |
| 2,016,039 | Hurrell | Oct. 1, 1935 |
| 2,142,542 | Wallach | Jan. 3, 1939 |
| 3,014,827 | Clinchy et al. | Dec. 26, 1961 |

FOREIGN PATENTS

| | | |
|---|---|---|
| 556,351 | Great Britain | Sept. 30, 1943 |
| 810,901 | Germany | Aug. 13, 1951 |

UNITED STATES PATENT OFFICE
CERTIFICATE OF CORRECTION

Patent No. 3,058,860                          October 16, 1962

Donald P. Rutter

It is hereby certified that error appears in the above numbered patent requiring correction and that the said Letters Patent should read as corrected below.

On the sheet of drawing, line 2, and in the heading to the printed specification, line 2, title of invention, for "SNAP-ON METAL JACKETED PIPE INSULATION" read -- METAL JACKETED INSULATION --.

Signed and sealed this 26th day of February 1963.

(SEAL)
Attest:

ESTON G. JOHNSON                                  DAVID L. LADD
Attesting Officer                                          Commissioner of Patents